(12) United States Patent
Ammons

(10) Patent No.: US 10,179,563 B2
(45) Date of Patent: Jan. 15, 2019

(54) SEATBELT SAFETY RELEASE DEVICE

(71) Applicant: Albert Ammons, Chicago, IL (US)

(72) Inventor: Albert Ammons, Chicago, IL (US)

( * ) Notice: Subject to any disclaimer, the term of this patent is extended or adjusted under 35 U.S.C. 154(b) by 15 days.

(21) Appl. No.: 15/619,033

(22) Filed: Jun. 9, 2017

(65) Prior Publication Data

US 2017/0274868 A1    Sep. 28, 2017

Related U.S. Application Data

(63) Continuation-in-part of application No. 14/170,421, filed on Jan. 31, 2014, now abandoned.

(60) Provisional application No. 61/759,271, filed on Jan. 31, 2013.

(51) Int. Cl.
| | |
|---|---|
| *B60R 22/00* | (2006.01) |
| *B60R 22/32* | (2006.01) |
| *A44B 11/25* | (2006.01) |

(52) U.S. Cl.
CPC ........ *B60R 22/322* (2013.01); *A44B 11/2507* (2013.01); *A44B 11/2561* (2013.01); *A44B 11/2569* (2013.01); *B60R 22/321* (2013.01); *Y10T 24/45466* (2015.01)

(58) Field of Classification Search
CPC . B60R 22/322; B60R 22/321; A44B 11/2507; A44B 11/2561; A44B 11/2569; Y10T 24/45466
USPC .................. 297/468; 280/801.1, 808; 24/603
See application file for complete search history.

(56) References Cited

U.S. PATENT DOCUMENTS

| | | | |
|---|---|---|---|
| 4,162,715 A | | 7/1979 | Coulombe |
| 4,489,804 A | * | 12/1984 | Kamijo .................... B60R 22/44 180/268 |
| 4,553,625 A | * | 11/1985 | Tsuge .................... B60R 22/321 180/268 |
| 4,574,911 A | * | 3/1986 | North .................... B60R 22/321 180/270 |
| 4,678,928 A | * | 7/1987 | Nishimura ............ B60R 22/321 180/282 |
| 5,123,673 A | | 6/1992 | Tame |
| 5,165,498 A | | 11/1992 | Garboli et al. |
| 5,181,738 A | | 1/1993 | Shimizu |
| 5,765,660 A | | 6/1998 | Ambrosi |
| 6,123,166 A | * | 9/2000 | Verellen ................ B60R 22/321 180/268 |
| 6,237,950 B1 | | 5/2001 | Cook et al. |
| 7,717,216 B2 | | 5/2010 | Rooyen |
| 8,240,012 B2 | | 8/2012 | Walega et al. |
| 8,590,935 B1 | * | 11/2013 | Leedy ................... B60R 22/321 180/270 |

(Continued)

*Primary Examiner* — Toan C To
(74) *Attorney, Agent, or Firm* — The Law Firm of Andrea Hence Evans, LLC

(57) ABSTRACT

A vehicle safety release system effecting an automated release and having, inter alia, a seatbelt, an integrated circuit (control unit), a power source, a transmitter, and a collision detection sensor, is contemplated. The safety release system also contemplates a manual release built to work in tandem with the system's automated release. The safety release system may be operated by both a manual input and the input from one or more collision detection sensors. When a push button is depressed a signal is sent to the control unit to release the seatbelt. Aspects of embodiments of the invention also contemplate access to the seatbelt's base latch to enable removal, if needed.

6 Claims, 13 Drawing Sheets

(56) References Cited

U.S. PATENT DOCUMENTS

| | | |
|---|---|---|
| 8,720,946 B2 | 5/2014 | Prima et al. |
| 2010/0101060 A1 | 4/2010 | Walega et al. |
| 2010/0186203 A1 | 7/2010 | Thomas |
| 2011/0315466 A1 | 12/2011 | Ammons |
| 2014/0223703 A1 | 8/2014 | Ammons |
| 2016/0355157 A1* | 12/2016 | Cech .................. B60R 22/48 |

* cited by examiner

SEATBELT SAFETY RELEASE DEVICE

CLAIM OF PRIORITY

This patent application is a continuation-in-part application to U.S. Non-Provisional patent application Ser. No. 14/170,421 entitled "Seatbelt Safety Release" which in turn claims priority under 35 USC 119 (e) (1) from U.S. Provisional Patent Application Ser. No. 61/759,271 filed Jan. 31, 2013, entitled, "Seatbelt Safety Release", the contents of which are herein incorporated in their entirety.

FIELD OF THE INVENTION

The present invention pertains to the field of automotive safety devices, and more specifically to the field of seatbelt release devices.

BACKGROUND OF THE INVENTION

All vehicles in the world have a main focus on safety. The most important and useful of all automotive safety devices is the common seat belt. Designed to restrain both drivers and passengers during a crash, seat belts are found in the vast majority of cars, buses and trucks on the road. During a crash, properly fastened safety belts distribute the forces of rapid deceleration over larger and stronger parts of a person's body, such as hips, chest and shoulders. Stretching slightly to slow the body down and increase stopping distance, a properly buckled seat belt is crucial to the well-being of those involved in minor fender benders and severe automobile crashes alike.

Although wearing a contemporary seat belt (as shown in FIG. 5) when traveling in a car, van or truck is a key factor in surviving an accident and is in fact, mandatory in most states, these safety implements present a drawback. In the event of an impact, there are times that the seat belt turns the motorist into a virtual prisoner. Impossible to release, the seat belt traps the occupants of the vehicle, making it difficult for them to escape the wrecked car and for rescue personnel to free them. It is an extremely scary, and potentially deadly, scenario when one is trapped in a burning vehicle or submerged in water and is unable to get to safety because of being trapped by a seat belt. Many lives, after vehicle collisions, are in danger by being stuck in the safety belt. A matter of seconds after a collision are crucial; people could be stuck by a crushed car, or knocked out from the impact being unable to release the safety belt. Having it automated allows for one less way of being trapped. If someone has to pull them out it can takes time; being already released gives precious seconds in a life or death situation. The prior art has put forth several designs for seatbelt release devices. Among these are:

U.S. Pat. No. 4,574,911 to Lawrence A. North describes a seat belt buckle emergency release system that is electrically actuated after the vehicle has come to rest.

U.S. Pat. No. 4,162,715 to George Coulonbe describes an automatic releasing seat belt. Upon impact, the sensors operate a timer which disposes the solenoid into an activated condition releasing all of the belt mechanisms electrically coupled to it.

U.S. Pat. No. 5,181,738 to Shigeichi Shimizu describes an automatic seat belt unlocking device mechanically configured with a lock box structure, a mounting structure and a releasable device which is operably connected between the mounting structure and the locking lever.

None of these prior art references describe the present invention. As such, there is a need for an automated safety belt release in case of a collision. Saving time on one step could mean life or death.

SUMMARY OF THE INVENTION

It is an object of the present invention to provide an improved seatbelt release device. Aspects of embodiments of the present invention contemplate the device having, inter alia, an Integrated Circuit (or control unit), a power source, and a signal receiver/transmitter. The device may also be configured to work with a number of collision detection sensors, which, when a collision occurs, transmit a signal to a control unit which will release the seatbelt safety release device. In one aspect of an embodiment of the present invention, this may take place after a set delay for the seatbelt safety release device to do its intended job. The invention may also have a manual release button that works by sending a signal from a push button to the control unit to release the safety belt immediately. There may also be access to the built in release latch in case of a need to remove the invention.

The present invention, hereinafter referred as the Seatbelt Q—Release, or Seatbelt Safety Release Device is an electronic assembly that disengages the seat belt lock following an impact. The need for the Seatbelt Safety Release Device is necessary for everyone in a vehicle, as it helps not only the passengers but the rescue personnel as well. Having to reach or cut the safety belt, not everyone has the training or the tools, after an accident can be complicated. Having it already released makes it easier and faster to rescue the persons in need. Imagine someone driving into the water, in the panic they have to release the safety belt, having it already release saves them precious time and potentially their lives.

The Seatbelt Safety Release device may be installed directly into a seatbelt locking bay, and, in one aspect of an embodiment of the present invention, be equipped or configured to automatically release the belt shortly after impact. The Seatbelt safety release device, as contemplated herein, will ensure quick release of seatbelts after a vehicle or car accident. The device may be programmed, in one aspect of an embodiment of the present invention, using Bluetooth connectivity for the sensors that are installed on the car. In an aspect of an embodiment of the present invention, a number of sensors may be installed in parts of the vehicle such as the front and rear inside bumpers of the vehicle. Additional sensors can be installed on the under carriage sides of the vehicle as well. The seatbelt safety release device may then be manually attached to seatbelt tongue of the interior seatbelts while the belt buckle locks into the bottom of the seatbelt safety release device by way of an interior tongue located within the seatbelt safety release device. Once the occupants of the car lock their seatbelts in place the seatbelt safety release device is ready to receive transmissions. If the car experiences any impact in the area where the sensors are installed a signal is sent from the sensors upon impact to the seatbelt safety release device. In an aspect of an embodiment of the present invention, this may take place within 15 seconds. The time for response is flexible and can be programmed into the seatbelt safety release device. The signal transmission, notifying the device of the collision or impact, may be sent from the sensors to the device via the frequency that will activate a motor and release the seatbelt safety release device automatically. If the car does not experience any collision or impact then the device can be manually released using a push button.

DETAILED DESCRIPTION OF THE INVENTION

Figure 1A:
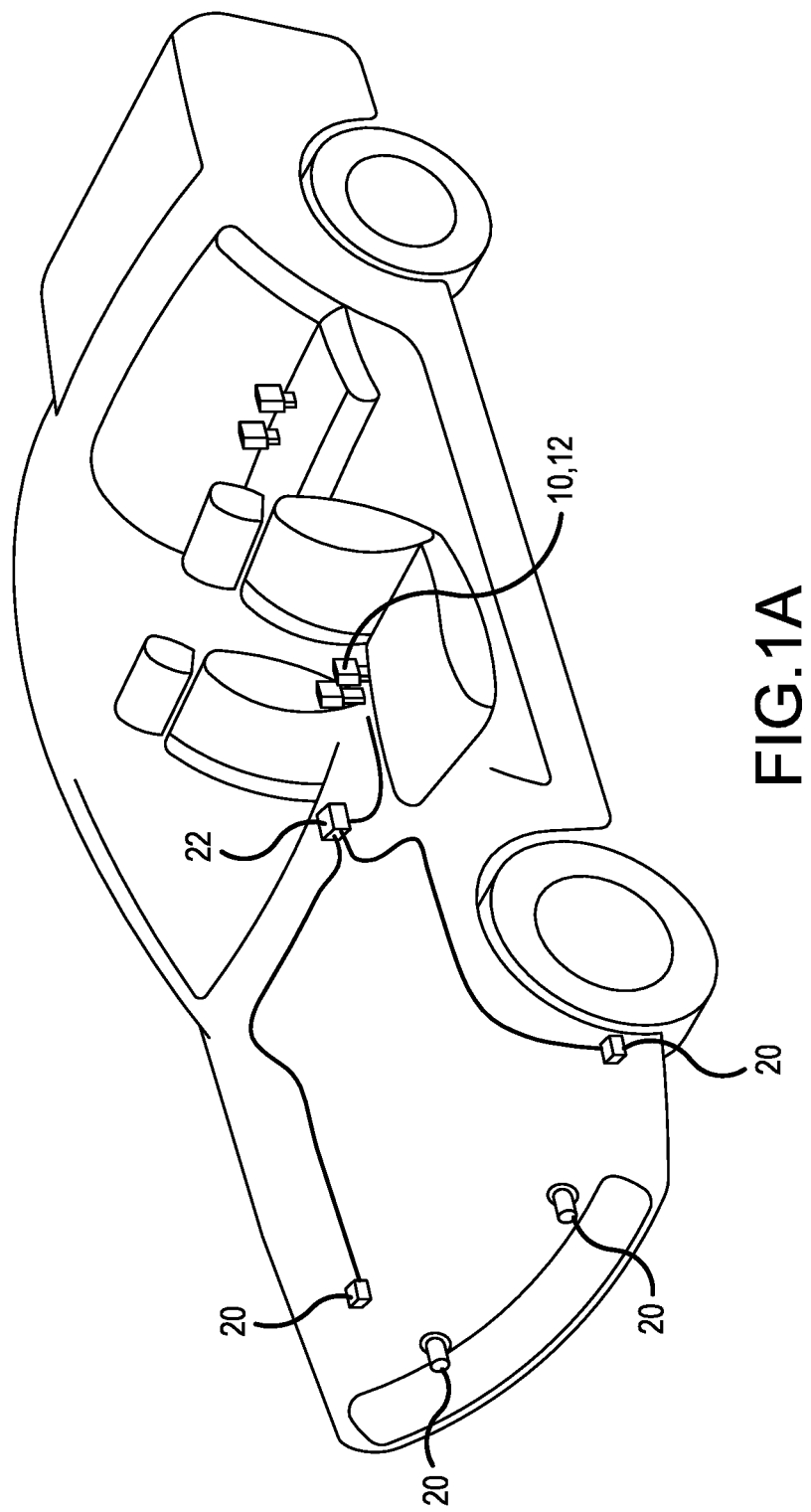
FIGS. 1A & 1B illustrate elevational angled perspective views of a seatbelt safety release device as mounted in an automobile showing a diagnostic module, and sensors located within the automobile according to an aspect of an embodiment of the present invention.
Figure 1B:
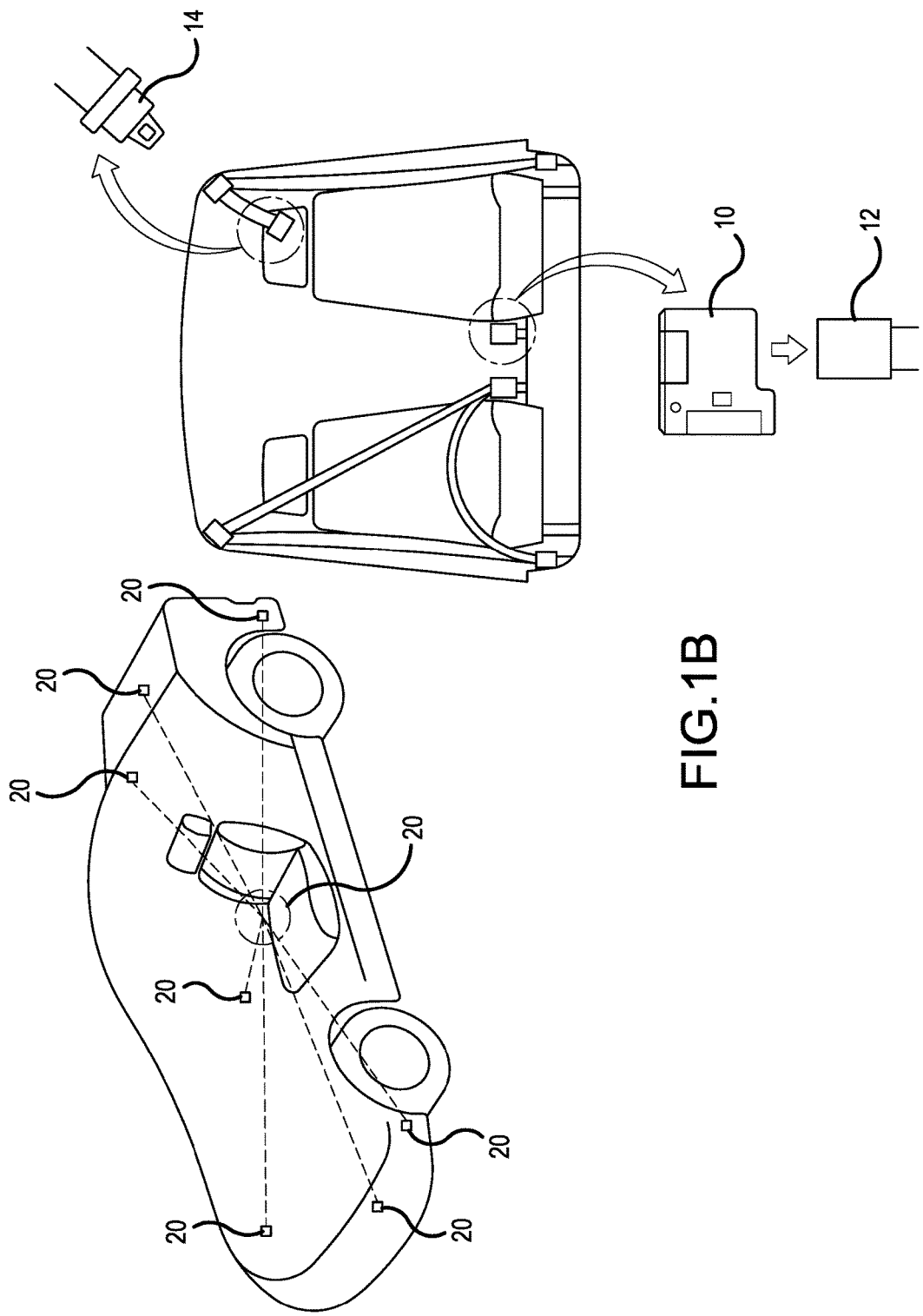
Figure 2:
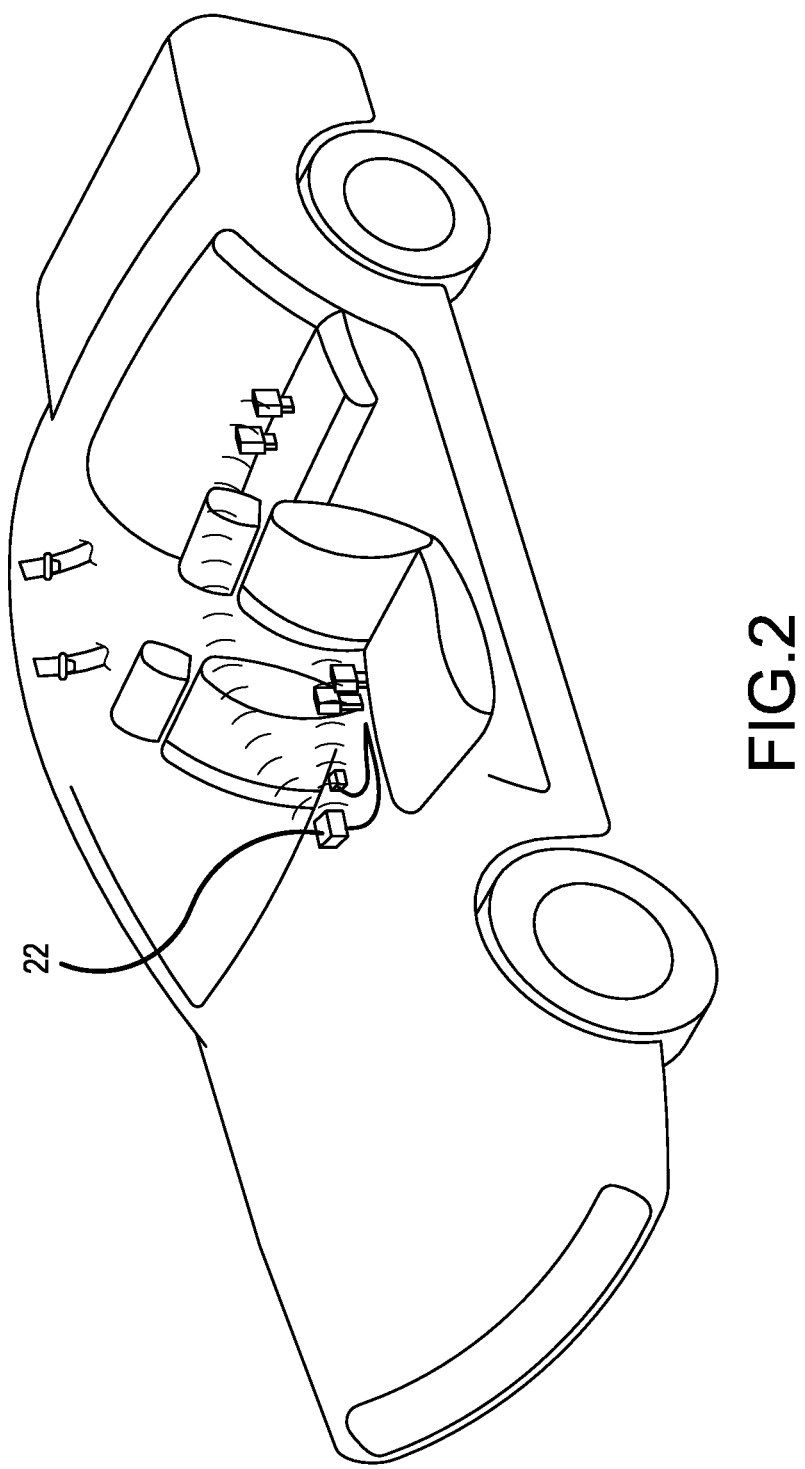
FIG. 2 illustrates an elevational angled perspective view of a seatbelt safety release device as mounted in an automobile showing a radio frequency (RF) emitter within the automobile and in operation according to an aspect of an embodiment of the present invention.
Figure 3:
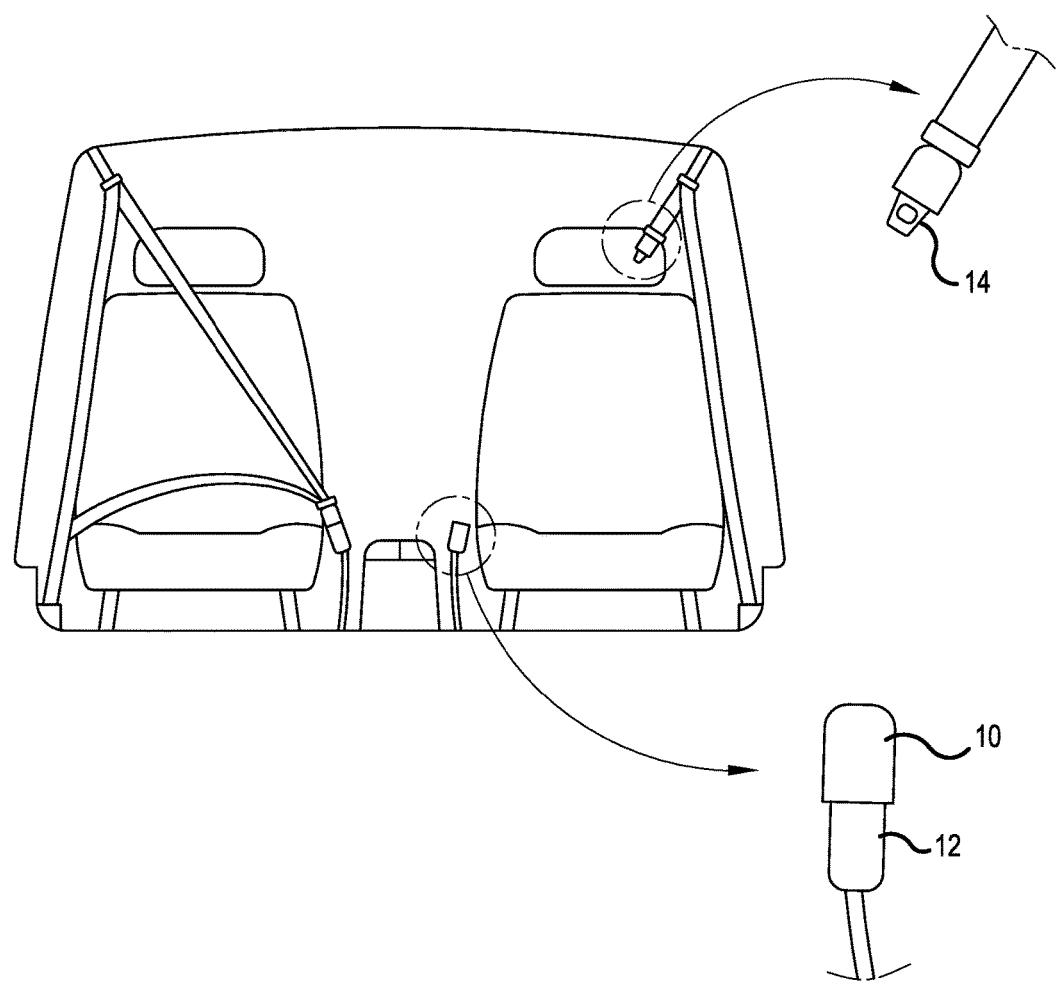
FIG. 3 illustrates an elevational front view of a seatbelt safety release device as mounted in an automobile showing the seat belt buckle attachment and adapter according to an aspect of an embodiment of the present invention.
Figure 4A:
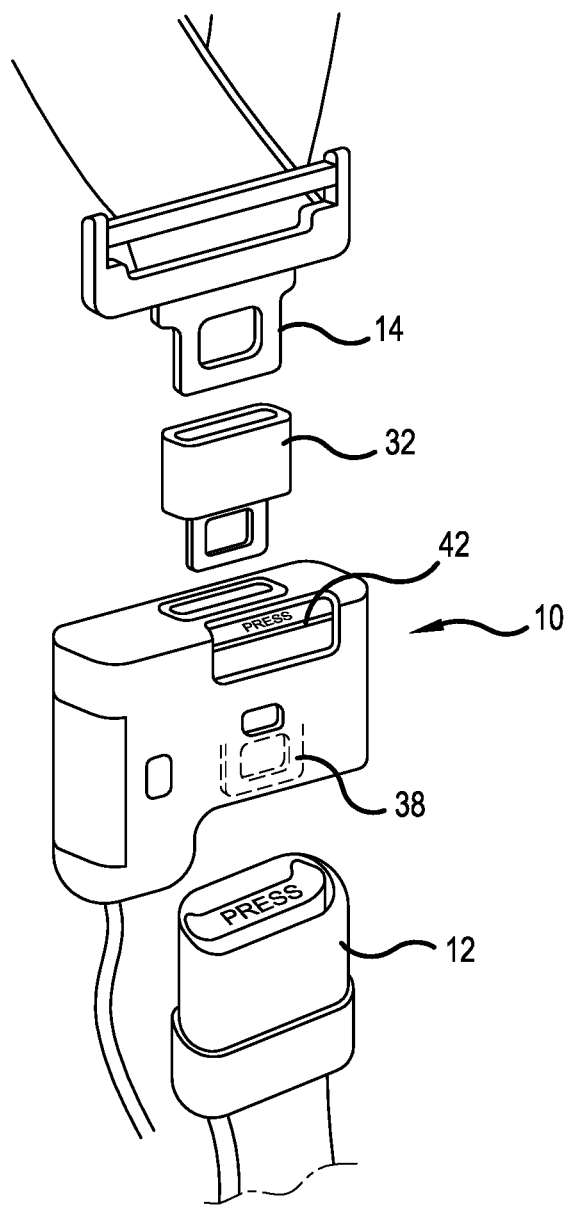
FIG. 4A illustrates an exploded view of a seatbelt safety release device as mounted on a seat belt buckle according to an aspect of an embodiment of the present invention.
Figure 4B:
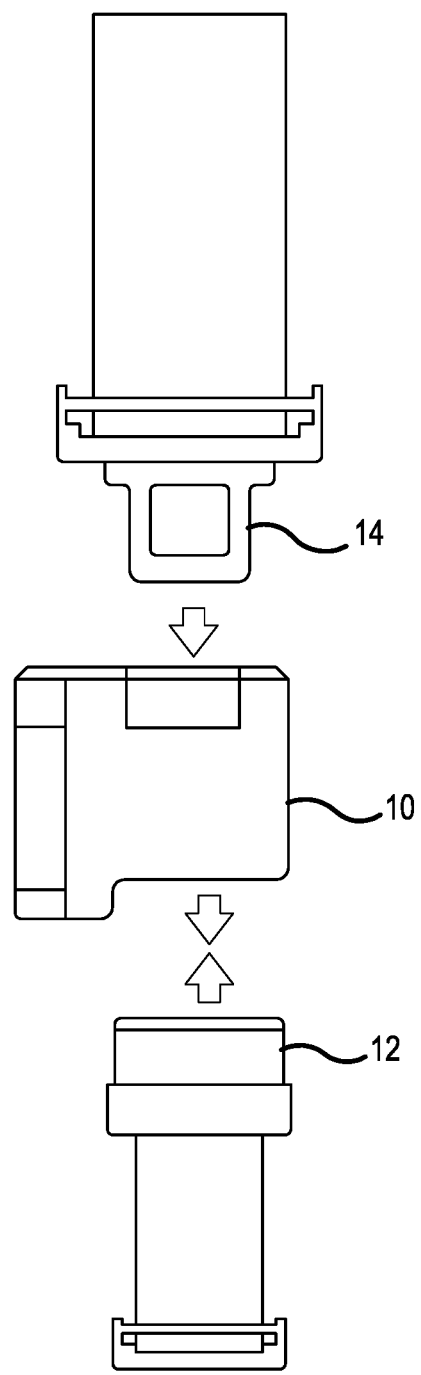
FIG. 4B illustrates a view of a seatbelt safety release device in relation to a seat belt tongue and a seat belt buckle according to an aspect of an embodiment of the present invention.
Figure 4C:
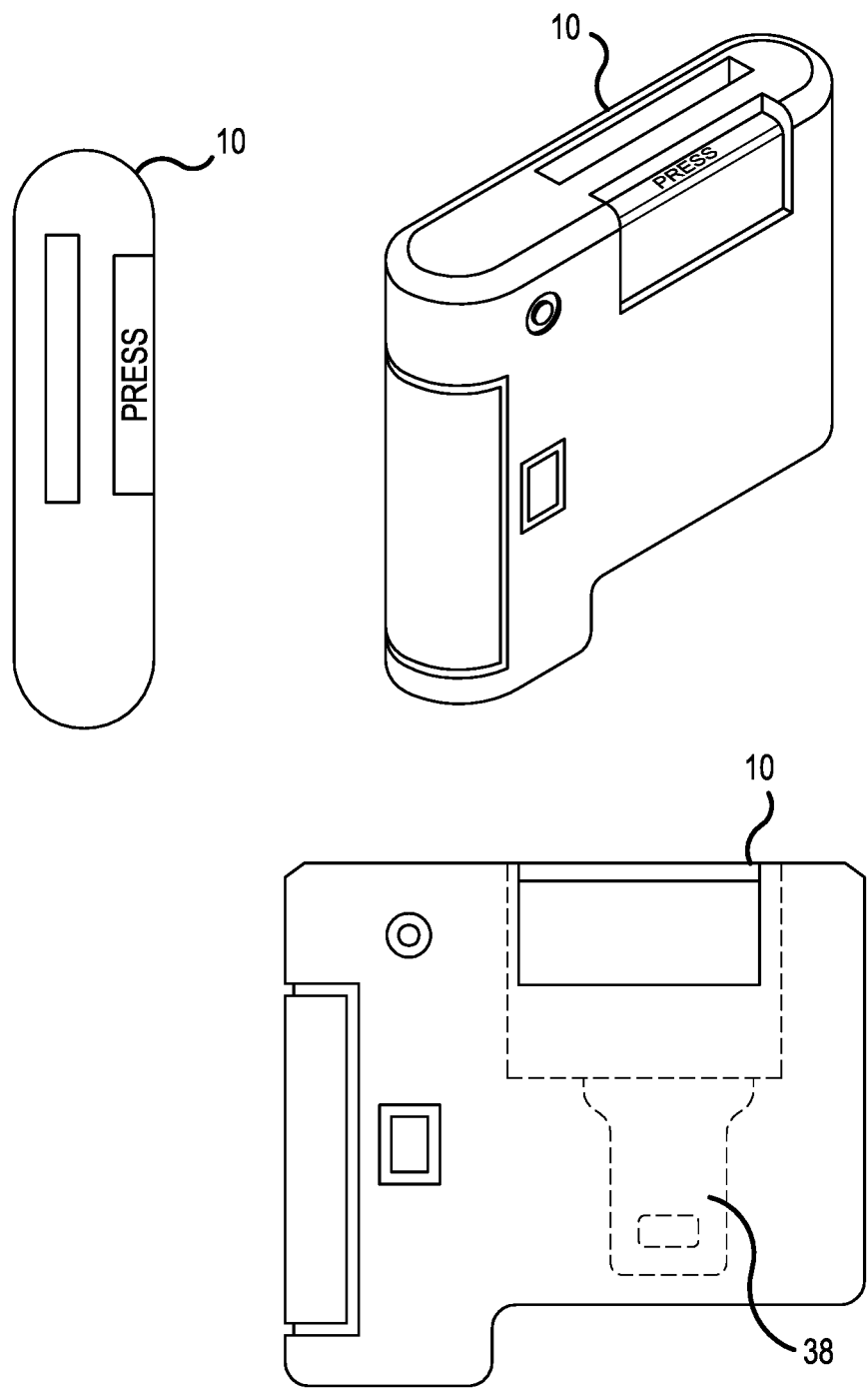
FIG. 4C illustrates top, isometric and right views of a seatbelt safety release device according to an aspect of an embodiment of the present invention.
Figure 5:
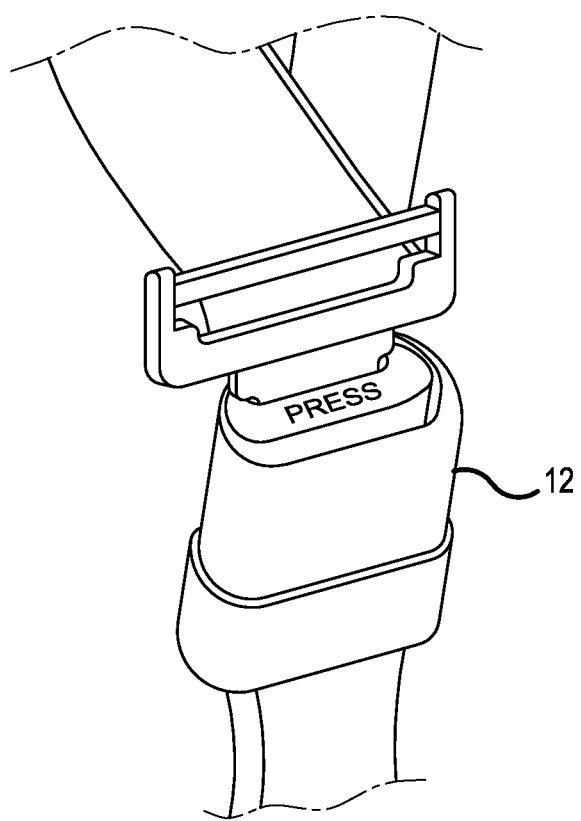
FIG. 5 illustrates a regular seatbelt assembly in use.

Referring now to FIGS. 1A through 2, perspective views of a seatbelt safety release device 10 and other components in use are shown according to aspects of embodiments of the present invention. Here, a system of sensor(s) 20 are shown located within the vehicle and configured to detect a collision. Impact or collision, is detected by sensors 20, which are meant or configured to detect the impact and send a signal by means of diagnostic module 22 to the device 10. This action is achieved via a transmitting and receiving system, which constitutes the Seatbelt Safety Release device 10.

Referring now to FIGS. 4A-4C, 6 & 7, different views of seatbelt safety release device 10 are shown according to aspects of embodiments of the present invention. Seatbelt Safety Release device 10, shown in FIGS. 4A & 4C, may be installed directly into the seatbelt locking bay 12, and may, in one aspect of an embodiment of the present invention, be equipped to automatically release the belt five seconds after impact. In an aspect of an embodiment of the present invention, seatbelt safety release device 10 may also include or may be configured to connect with adapter piece 32 which may be used to connect with any size of seatbelt tongue 14 on one end and latch 36 of seatbelt safety release device 10 on the other end (via seatbelt locking mechanism 16). In the case of a collision, the device will operate to disconnect from adapter piece 32 by unlocking latch 36 and/or ejecting adapter piece 32 from its connection with device 10.

Figure 7:
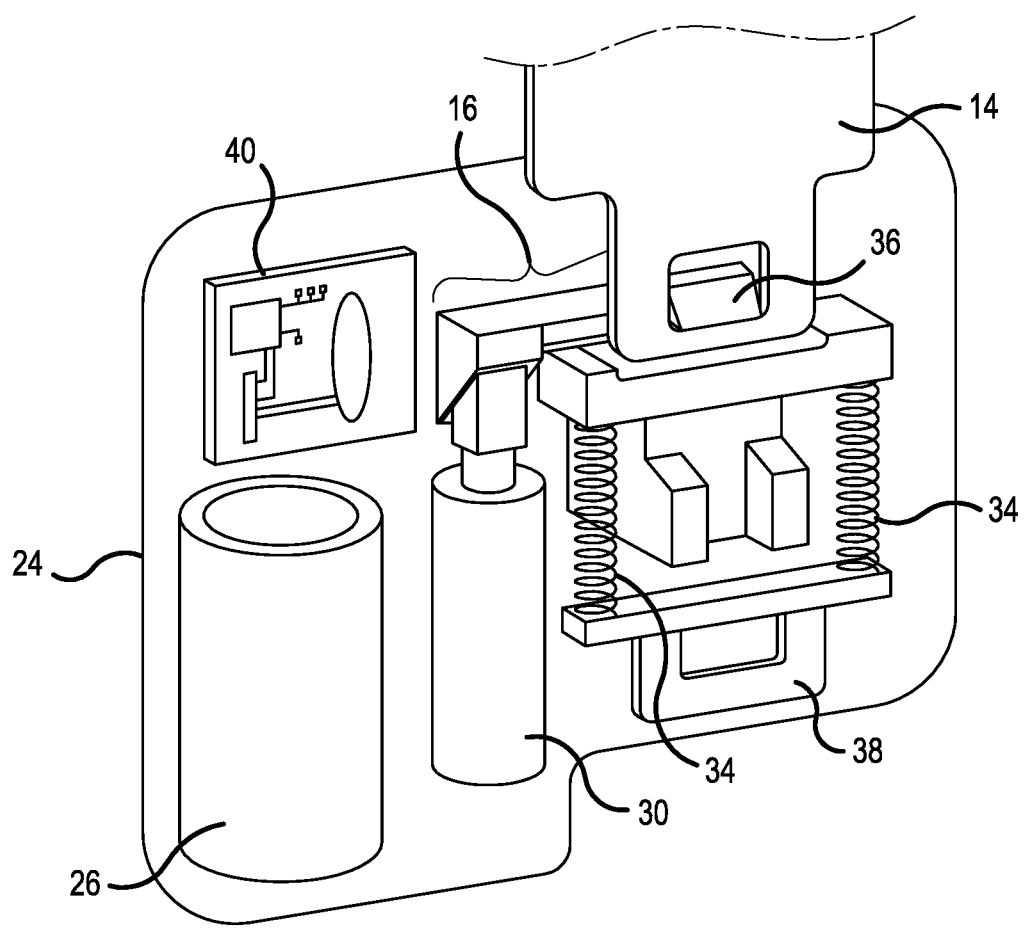
FIG. 7 illustrates an interior view of a seatbelt safety release device showing some of its internal components according to an aspect of an embodiment of the present invention.

Seatbelt safety release device 10, shown in FIG. 7, may include an electronic unit featuring a transmitter, frequency generator, amplifier, internal antenna, and electrical/electronic components with respective circuitry encased within a durable plastic housing 24. Also enclosed within the plastic housing 24 is battery 26 that powers the unit. The receiver may utilize a tuned frequency, and may include a receiver circuit, and replaceable battery. When a crash occurs, transmitter unit or diagnostic module 22 generates and transmits a signal. The companion receiving unit or signal receiver (48) contained within device 10 is tuned to the specific frequency generated by the transmitter unit or diagnostic module 22. Upon reception of the signal generated by the transmitter unit 22, the circuitry in the receiver generate an 'enable' signal to a logic device an 'AND' integrated circuit chip or comparable, which applies a voltage level to the seatbelt lock, causing the system to be activated. This action, activates solenoid 30, which in turn, disengages the lock, by activating springs 34 which push out the latch, freeing the motorist from the seat belt.

Figure 6:
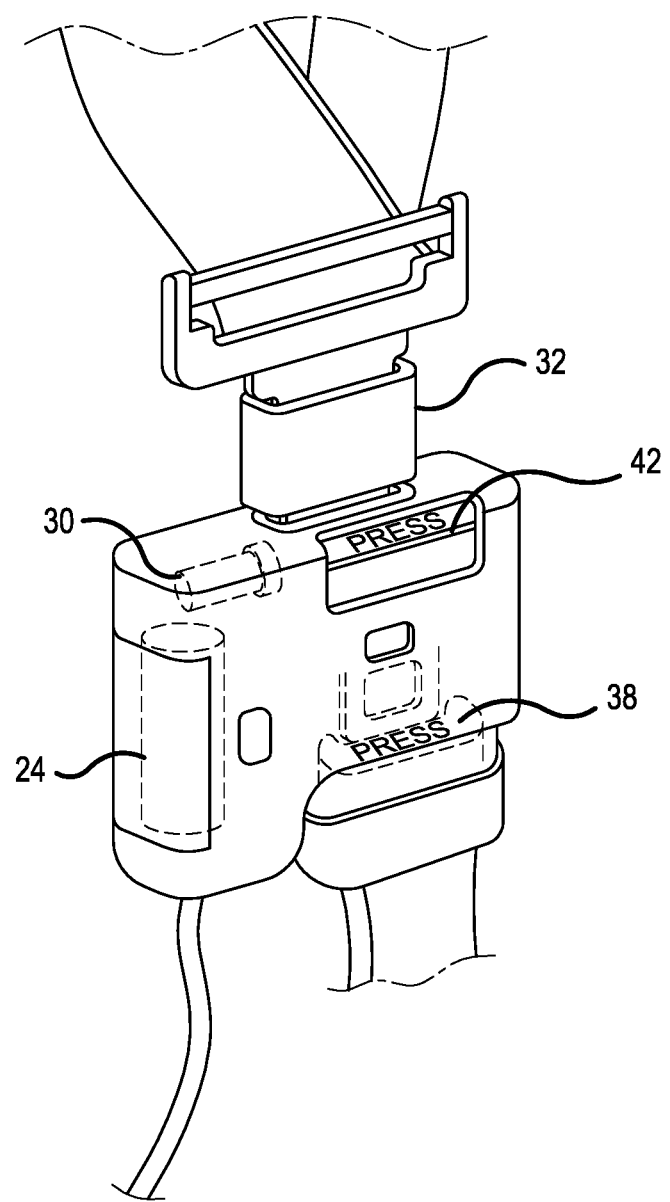
FIG. 6 illustrates a perspective view of a seatbelt safety release device as mounted on a seat buckle showing some of its internal components in shadow according to an aspect of an embodiment of the present invention.

FIG. 6 shows an alternative embodiment wherein the solenoid 30 is positioned in device 10 in different position than that shown in FIG. 7.

The Seatbelt Safety Release Device stands to save many lives, regardless of the severity of the accident. Facilitating a motorist's own escape as well as easing the efforts of professional rescue personnel, the product of the current invention proves an ideal addition to any vehicle, whether car, truck, van, RV, SUV, bus, and airplane.

Seatbelt Safety Release Device/system 10 is an improvement on the seatbelt technology of today. Seatbelt Safety Release Device/system 10 contemplates automation of the seat belt release process in an emergency. In an aspect of an embodiment of the present invention, Seatbelt Safety Release Device/system 10 may be configured to work in tandem with a manual release pushbutton 42.

Figure 8:
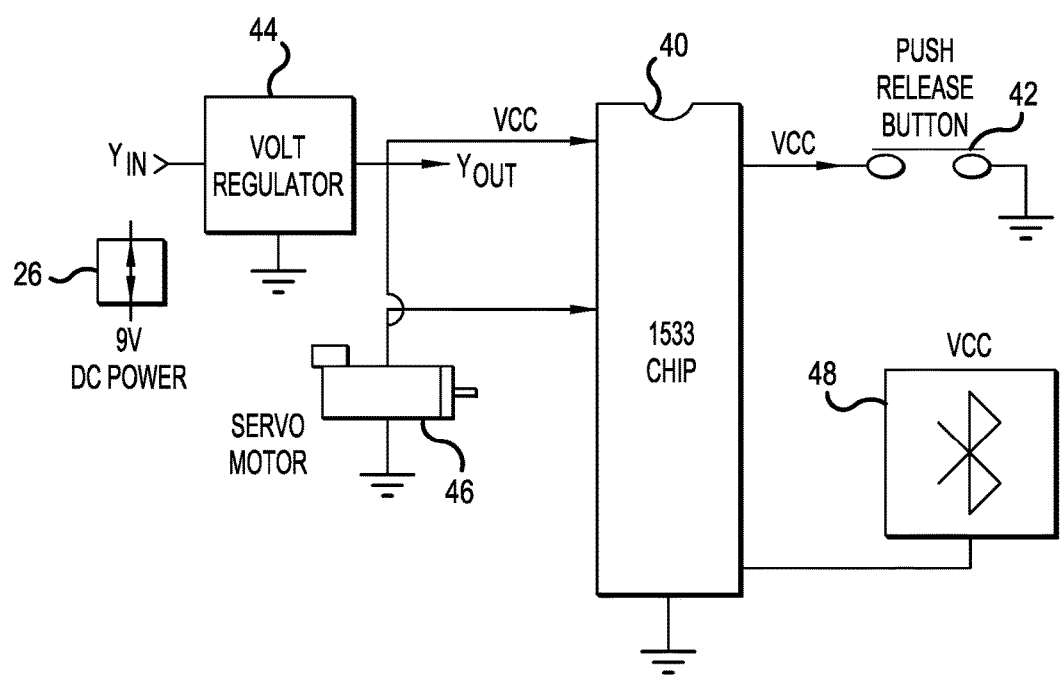
FIG. 8 illustrates a circuit diagram of a transmitter of a seatbelt safety release device according to an aspect of an embodiment of the present invention.
Figure 9:
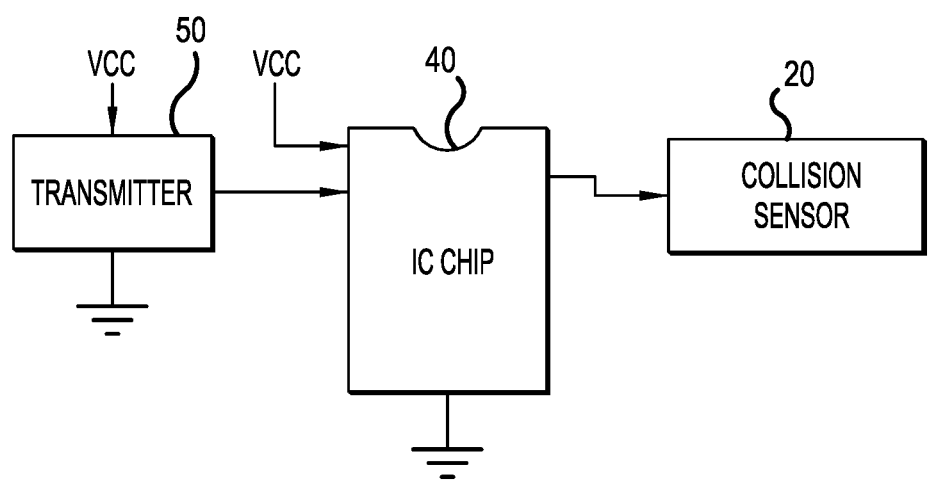
FIG. 9 illustrates a receiver circuit diagram of a seatbelt safety release device according to an aspect of an embodiment of the present invention.

Referring now to FIGS. 8 & 9, different circuit diagrams of certain components of seatbelt safety release device 10 are shown according to aspects of embodiments of the present invention.

In an aspect of an embodiment of the present invention, seatbelt safety release device 10 may also include a small Integrated circuit 40 as shown in FIG. 8. Integrated circuit 40 may include one or more processor(s) (not shown) which would be responsible for the implementation and control of the operations of seatbelt safety release device 10. In an aspect of an embodiment of the present invention, the processor of integrated circuit 40 may be programed to work with a system of collision detection sensors 20 located throughout the vehicle. In an aspect of an embodiment of the present invention, sensors 20 may operate with a dedicated integrated circuit located within diagnostic module 22 which may be in communication with the transmitter(s) of diagnostic module 22. In another aspect of an embodiment of the present invention, the transmitter(s) of diagnostic module 22 may be wirelessly connected to integrated circuit 40. Collision sensors 20 are configured to send a signal to transmitter 50 of diagnostic module 22 when a collision is detected (FIG. 9). In another aspect of an embodiment of the present invention, sensor(s) 20 may directly send a signal, indicating a collision, to integrated circuit 40.

Integrated circuit 40 may also be in communication with manual push button 42, another element of seatbelt safety release device 10. In an aspect of an embodiment of the present invention, integrated circuit 40 may also include signal receiver 48 which may be in communication with transmitter 50 for receiving signals sent from diagnostic module 22 (or directly from collision sensor(s) 20) upon collision. In an aspect of an embodiment of the present invention, integrated circuit 40 may be configured to drive or trigger servo motor 46 which then moves latch 36 (of seatbelt locking mechanism 16) which frees seatbelt safety release device tongue 38. The user is then released from the seatbelt and is able to exit the vehicle. In another aspect of an embodiment of the present invention, servo motor 46 may be used to move latch 36 onto seatbelt safety release device tongue 38 when a user first deploys seatbelt safety release device 10 upon entering the vehicle.

In an aspect of an embodiment of the present invention, seatbelt safety release device 10 may be fitted over the normal buckle latch of a vehicle's seatbelt system as shown in FIG. 6. A removable panel will be there for if it needs to be placed; seatbelt safety release device 10 may be secured as a permanent replacement (until such time as it is built into vehicles as stock parts).

In an aspect of an embodiment of the present invention, transmitter 50, upon receipt of signal(s) from collision sensor(s) 20, sends a signal to receiver 48. Signal receiver 48 then notifies integrated circuit 40 to trigger servo motor 40 to release the latch 36 of seatbelt locking mechanism 16 from the seat belt tongue 14.

In another aspect of an embodiment of the present invention, tongue 38 of seatbelt safety release device 10 may be disengaged from seatbelt locking bay 12 when the collision signal is received by integrated circuit 40. In yet another aspect, both tongue 38 and latch 36 of seatbelt safety release device 10 may be disengaged from seat belt tongue 14 and seatbelt locking bay 12 when a collision signal is received by integrated circuit 40.

In another aspect of an embodiment of the present invention, seatbelt safety release device 10 may have a built in time delay to make sure the seatbelt does its job, then when the delay is over the seatbelt will be released. Manual release button 42 is there to tell the motor to release the latch on the seat belt; it will work just like it normally does.

Operation of integrated circuit 40 (and thus release of the seatbelt) may be based on two Inputs—one from manual pushbutton 42 (whereby a user manually depresses pushbutton 42 which triggers a signal to servo motor 46 to release latch 36), and the other from receiver 48, which notifies integrated circuit 40 of a collision. With this system in place it can be all the seatbelts in the car can have a Q Release on them, and the transmitters will send the signal to all the receivers so all will work at the same time.

Figure 10:
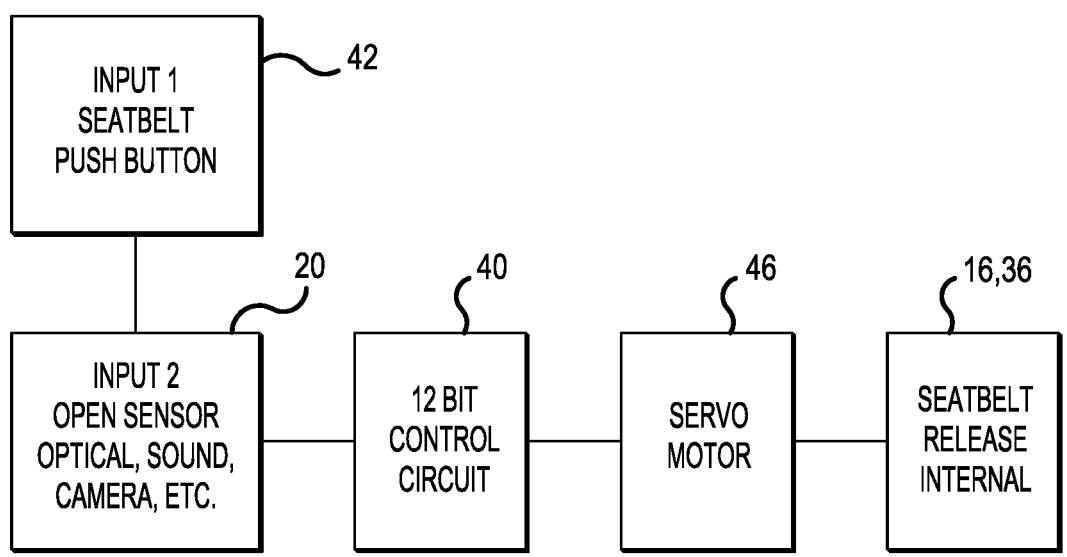
FIG. 10 illustrates a control diagram for a seatbelt safety release device according to an aspect of an embodiment of the present invention.

Referring now to FIG. 10 a control diagram for seatbelt safety release device 10 is shown according to an aspect of an embodiment of the present invention. Here, integrated circuit or control unit 40 may receive a signal input signifying a collision or impact from either of push button 42 or sensor(s) 20. This may also occur in a case of non-impact where the driver or user my just want to exit the vehicle and depresses push button 42. The signal would activate control unit 40 to trigger servo motor 46 to activate seatbelt locking mechanism 16 to move latch 36, thereby unlocking or uncoupling latch 36 from seatbelt tongue 14. Seatbelt locking mechanism 16 may also be activated by servo motor 46 to unlock seatbelt safety release tongue 38 from seatbelt locking bay 12. In another aspect of an embodiment of the present invention where adapter piece 32 is used, the signal would activate control unit 40 to trigger servo motor 46 to activate seatbelt locking mechanism 16 to move latch 36, thereby unlocking or uncoupling latch 36 from adapter piece 32.

In an aspect of an embodiment of the present invention, the control unit may be configured to delay activation of servo motor 46 upon receipt of a signal from sensor(s) 20. In one aspect of an embodiment of the present invention, this delay may be 10-15 seconds. The delay times may be programmed into the chip or control unit 40.

Although this invention has been described with respect to specific embodiments, it is not intended to be limited thereto and various modifications which will become apparent to the person of ordinary skill in the art are intended to fall within the spirit and scope of the invention as described herein taken in conjunction with the accompanying drawings and the appended claims.

What is claimed is:

1. A seatbelt safety release device, comprising:
    an integrated circuit, having at least one processor;
    a signal receiver, in communication with the integrated circuit, wherein the signal receiver is configured to receive a signal from at least one sensor and wherein the signal is transmitted to the integrated circuit;
    a seatbelt safety release device tongue configured for connection with a seatbelt locking bay;
    a seatbelt locking mechanism, having a latch for engaging a seatbelt tongue;
    wherein the seatbelt locking mechanism is configured to lock onto the tongue of an adapter piece;
    a servomotor in communication with the integrated circuit, wherein the servomotor is configured to release the seatbelt safety release device tongue from its engagement with the seatbelt locking bay; and
    a button configured to trigger the servomotor's release of the tongue from its engagement with the seatbelt locking bay.

2. The device of claim 1 further comprising a battery in communication with the servomotor and the integrated circuit, wherein the battery provides power for the device.

3. The device of claim 1, wherein the integrated circuit, upon receipt of a signal from the signal receiver, is configured to trigger the servomotor to release the tongue from its engagement with the seatbelt locking bay.

4. The device of claim 3, wherein the at least one sensor generates and sends a signal to the signal receiver upon the sensor's detection of a collision.

5. The device of claim 3, wherein the integrated circuit is configured to trigger the servomotor engagement release after a predetermined time delay.

6. The device of claim 1, wherein the servomotor is configured to release the latch from its engagement with the seatbelt tongue.

* * * * *